(12) United States Patent
Deng et al.

(10) Patent No.: US 12,118,993 B2
(45) Date of Patent: Oct. 15, 2024

(54) FULL-DUPLEX VOICE DIALOGUE METHOD

(71) Applicant: AI Speech Co., Ltd., Jiangsu (CN)

(72) Inventors: Jiankai Deng, Jiangsu (CN); Jinrui Gan, Jiangsu (CN)

(73) Assignee: AI Speech Co., Ltd., Jiangsu (CN)

( * ) Notice: Subject to any disclaimer, the term of this patent is extended or adjusted under 35 U.S.C. 154(b) by 278 days.

(21) Appl. No.: 17/639,624

(22) PCT Filed: Nov. 25, 2019

(86) PCT No.: PCT/CN2019/120609
§ 371 (c)(1),
(2) Date: Mar. 2, 2022

(87) PCT Pub. No.: WO2021/042584
PCT Pub. Date: Mar. 11, 2021

(65) Prior Publication Data
US 2022/0293100 A1 Sep. 15, 2022

(30) Foreign Application Priority Data

Sep. 4, 2019 (CN) .......................... 201910831253.6

(51) Int. Cl.
*G10L 15/22* (2006.01)
*G10L 15/30* (2013.01)
*G10L 25/87* (2013.01)

(52) U.S. Cl.
CPC ............. *G10L 15/22* (2013.01); *G10L 15/30* (2013.01); *G10L 25/87* (2013.01)

(58) Field of Classification Search
USPC ..................................................... 704/1–504
See application file for complete search history.

(56) References Cited

U.S. PATENT DOCUMENTS 9,911,410 B2 * 3/2018 Ben-David ............ G10L 15/065
10,002,611 B1 * 6/2018 Typrin ..................... H04L 51/10
(Continued)

FOREIGN PATENT DOCUMENTS

CN     105556594 A     5/2015
CN     105409197 A *   3/2016    .......... B25J 11/0005
(Continued)

OTHER PUBLICATIONS

EP19944180.9,EP search report,Sep. 5, 2022.
JP2022-513079, Notice of Reasons for Refusal,Jan. 31, 2023.

*Primary Examiner* — Marcus T Riley
(74) *Attorney, Agent, or Firm* — Sisson & Banyas, Attorneys at Law, LLC

(57) ABSTRACT

Disclosed is a full-duplex voice dialogue method applied to a voice dialogue terminal and including recording and uploading by an awakened voice dialogue terminal audio to a cloud server for determining a reply content and a first duration of the audio analyzed for determining the reply content; receiving by the voice dialogue terminal the reply content and the first duration sent by the cloud server; determining whether the first duration is equal to a duration from the moment awakening the voice dialogue terminal to the current moment of uploading the audio; and presenting the reply content to a user if consistent. Both the reply content determined by the cloud server and the duration of the audio is acquired, and the reply content is presented to the user only when the first duration and the second duration are determined as consistent, thereby ensuring proper reply content.

10 Claims, 4 Drawing Sheets

(56) References Cited

U.S. PATENT DOCUMENTS

| | | | |
|---|---|---|---|
| 11,217,251 B2 * | 1/2022 | York | G10L 15/22 |
| 11,521,609 B2 * | 12/2022 | Yamamoto | G06F 16/433 |
| 11,848,016 B2 * | 12/2023 | Xu | H04M 1/72448 |
| 2007/0239837 A1 | 10/2007 | Jablokov | |
| 2012/0069131 A1 * | 3/2012 | Abelow | G06Q 30/0601 |
| | | | 345/589 |
| 2015/0235642 A1 * | 8/2015 | Nishikawa | H04L 12/282 |
| | | | 704/249 |
| 2017/0053643 A1 * | 2/2017 | Ben-David | G10L 15/065 |
| 2018/0358019 A1 | 12/2018 | Mont-Reynaud | |
| 2022/0293100 A1 * | 9/2022 | Deng | G10L 15/22 |

FOREIGN PATENT DOCUMENTS

| | | | | |
|---|---|---|---|---|
| CN | 107000210 A | * | 8/2017 | B25J 11/0005 |
| CN | 107305483 A | | 10/2017 | |
| CN | 107863113 A | | 3/2018 | |
| CN | 108228131 A | | 6/2018 | |
| CN | 108305628 A | | 7/2018 | |
| CN | 109599111 A | | 4/2019 | |
| CN | 112447177 A | * | 3/2021 | G06F 3/167 |
| CN | 112735423 A | * | 4/2021 | |
| CN | 111630876 B | * | 8/2021 | G06F 3/165 |
| CN | 112447177 B | * | 8/2022 | G06F 3/167 |
| EP | 4027338 A1 | * | 7/2022 | G06F 3/167 |
| JP | WO2015098109 A1 | | 3/2017 | |
| WO | WO-2021042584 A1 | * | 3/2021 | G06F 3/167 |

* cited by examiner

FULL-DUPLEX VOICE DIALOGUE METHOD

PRIORITIES AND CROSS REFERENCES

This Application claims priority from International Application No. PCT/CN2019/120609 filed on 25 Nov. 2019, and Chinese Patent Application No. 201910831253.6 filed on 4 Sep. 2019, the teachings of each of which are incorporated by reference herein in their entirety.

TECHNICAL FIELD

The present disclosure relates to the field of artificial intelligence technologies, and in particular to a full-duplex voice dialogue method.

BACKGROUND

The full-duplex interaction mode in the existing voice dialogue is a mode in which voice interaction can be performed at any time in a wakeup state, with the biggest difference from half-duplex in that the freedom of the dialogue is mainly controlled by a user who can interrupt a dialogue state at any time and start a next round of interaction.

However, it is found by the inventors that the full-duplex voice dialogue method in the prior art has at least the following technical problems:

The situation cannot be located. It is not possible to have the dialogue correspond to the situation where a user is. When the user has started a second topic, the system is still interacting with the user in the logic of a first topic. This may be caused by network instability in which during an interaction process the user starts an interaction on a next topic before the system send a feedback to the current topic, resulting in that the system interacts with the user in different topic from the user's.

Distinction cannot be realized. Users speak at different speeds, and in the full-duplex mode, the system often starts interaction upon partially understanding a user's words, which renders a poor interaction experience. The reason may be that the full-duplex mode is initially designed to perform voice interaction at any time in a wakeup state, resulting in an instant starting of interaction as long as there is a semantic hit.

SUMMARY

Embodiments of the present disclosure provide a full-duplex voice dialogue method and system to solve at least one of the above technical problems.

In a first aspect, an embodiment of the present disclosure provides a full-duplex voice dialogue method applied to a voice dialogue terminal. The method may include:

recording and uploading, by the voice dialogue terminal when being awakened, audio to a cloud server such that the cloud server determines a reply content and a first duration of the audio analyzed for determining the reply content;

receiving, by the voice dialogue terminal, the reply content and the first duration sent by the cloud server;

determining, by the voice dialogue terminal, whether the first duration is equal to a second duration, the second duration being a duration from the moment when the voice dialogue terminal is awakened to the current moment when the audio is uploaded; and if the first duration is equal to the second duration, presenting, by the voice dialogue terminal, the reply content to a user.

In some embodiments, the method may further include: when the first duration is less than the second duration, determining whether a voice endpoint is contained in a redundant recording clip of the recorded audio corresponding to the second duration compared to the recorded audio corresponding to the first duration; and if not, presenting the reply content to the user; and if yes, discarding the reply content, and waiting for the cloud server to send a new reply content and a new first duration.

In some embodiments, after the audio is recorded, the method may further include: performing voice endpoint detection on the recorded audio, and storing voice endpoint information as detected, the voice endpoint information including a voice start time point and a voice end time point; and said determining whether the voice endpoint is contained in the redundant recording clip of the recorded audio corresponding to the second duration compared to the recorded audio corresponding to the first duration includes:

querying the voice endpoint information to determine whether there is a voice start time point or a voice end time point belonging to the redundant recording clip.

In a second aspect, the present disclosure also provides a full-duplex voice dialogue method applied to a cloud server. The method may include:

receiving recorded audio uploaded by a voice dialogue terminal;

analyzing the received recorded audio in real time to determine a reply content corresponding to a voice content contained in the recorded audio; and sending to the voice dialogue terminal the reply content and a first duration of the recorded audio analyzed for determining the reply content such that the voice dialogue terminal determines whether to present the reply content to a user based on consistency between the first duration and a second duration, the second duration being a duration from the moment when the voice dialogue terminal is awakened to the current moment when the audio is uploaded.

In some embodiments, the method may further include: if the first duration is less than the second duration and a voice endpoint is contained in a redundant recording clip of the recorded audio corresponding to the second duration compared to the recorded audio corresponding to the first duration, continuing to analyze the redundant recording clip and determine a new reply content and a new first duration; and sending the new reply content and the new first duration to the voice dialogue terminal.

In a third aspect, the present disclosure also provides a full-duplex voice dialogue system applied to a voice dialogue terminal. The system may include:

an audio uploading program module configured to, record and upload, by the voice dialogue terminal when being awakened, audio to a cloud server such that the cloud server determines a reply content and a first duration of the audio analyzed for determining the reply content;

a receiving program module configured to receive, by the voice dialogue terminal, the reply content and the first duration sent by the cloud server;

a determining program module configured to determine, by the voice dialogue terminal, whether the first duration is equal to a second duration, the second duration being a duration from the moment when the voice dialogue terminal is awakened to the current moment when the audio is uploaded; and a content presenting program module configured to, when the first duration is equal to the second duration, presenting, by the voice dialogue terminal, the reply content to a user.

In some embodiments, the system may further include: a voice endpoint querying program module configured to, when the first duration is less than the second duration, determine whether a voice endpoint is contained in a redundant recording clip of the recorded audio corresponding to the second duration compared to the recorded audio corresponding to the first duration; and if it is determined not contained, present the reply content to the user; and if it is determined contained, discard the reply content, and wait for the cloud server to send a new reply content and a new first duration.

In some embodiments, the system may further include: an endpoint detecting program module configured to, after the audio is recorded, perform voice endpoint detection on the recorded audio, and store voice endpoint information as detected, the voice endpoint information including a voice start time point and a voice end time point; and said determining whether the voice endpoint is contained in the redundant recording clip of the recorded audio corresponding to the second duration compared to the recorded audio corresponding to the first duration includes:

querying the voice endpoint information to determine whether there is a voice start time point or a voice end time point belonging to the redundant recording clip.

In a fourth aspect, the present disclosure also provides a full-duplex voice dialogue system applied to a cloud server. The system may include:

a receiving program module configured to receive recorded audio uploaded by a voice dialogue terminal;

a reply content determining program module configured to analyze the received recorded audio in real time to determine a reply content corresponding to a voice content contained in the recorded audio; and a sending program module configured to sending to the voice dialogue terminal the reply content and a first duration of the recorded audio being analyzed for determining the reply content such that the voice dialogue terminal determines whether to present the reply content to a user based on a consistency between the first duration and a second duration, the second duration being a duration from the moment when the voice dialogue terminal is awakened to the current moment when the audio is uploaded.

In some embodiments, the reply content determining program module may be further configured to, when the first duration is less than the second duration and a voice endpoint is contained in a redundant recording clip of the recorded audio corresponding to the second duration compared to the recorded audio corresponding to the first duration, continue to analyze the redundant recording clip and determine a new reply content and a new first duration; and the sending program module may be further configured to send the new reply content and the new first duration to the voice dialogue terminal.

In a fifth aspect, an embodiment of the present disclosure provides a storage medium that stores one or more programs including executable instructions that can be read and executed by an electronic device (including but not limited to a computer, a server, or a network device, etc.) to carry out the full-duplex voice dialogue method as described in any of the above of the present disclosure.

In a sixth aspect, an electronic device is provided, including: at least one processor, and a memory communicatively connected with the at least one processor, wherein the memory stores instructions executable by the at least one processor, and the instructions, when being executed by the at least one processor, causes the at least one processor to carry out the full-duplex voice dialogue method as described in any of the above of the present disclosure.

In a seventh aspect, an embodiment of the present disclosure also provides a computer program product, including a computer program stored on a storage medium, wherein the computer program includes program instructions, and the program instructions, when being executed by a computer, causes the computer to carry out the full-duplex voice dialogue method as described in any of the above of the present disclosure.

The voice dialogue terminal in the embodiment of the present disclosure may not only acquire the reply content determined by the cloud server, but may also acquire the duration (i.e., the first duration) of the audio analyzed by the cloud server to determine the reply content, and present the reply content to the user only when determining that the first duration is equal to the second duration. In this way, it is ensured that the content based on which the cloud server determines the reply content is consistent with the content uploaded by the cloud dialogue terminal, and thus a proper reply content can be provided.

BRIEF DESCRIPTION OF THE DRAWINGS

In order to explain the technical solutions of the embodiments of the present disclosure more clearly, the drawings that need to be used in the description of the embodiments will be briefly introduced hereinafter. Obviously, the drawings in the following description are some embodiments of the present disclosure. Those of ordinary skill in the art can also obtain other drawings based on these drawings without creative work.

DETAILED DESCRIPTION

Figure 1:
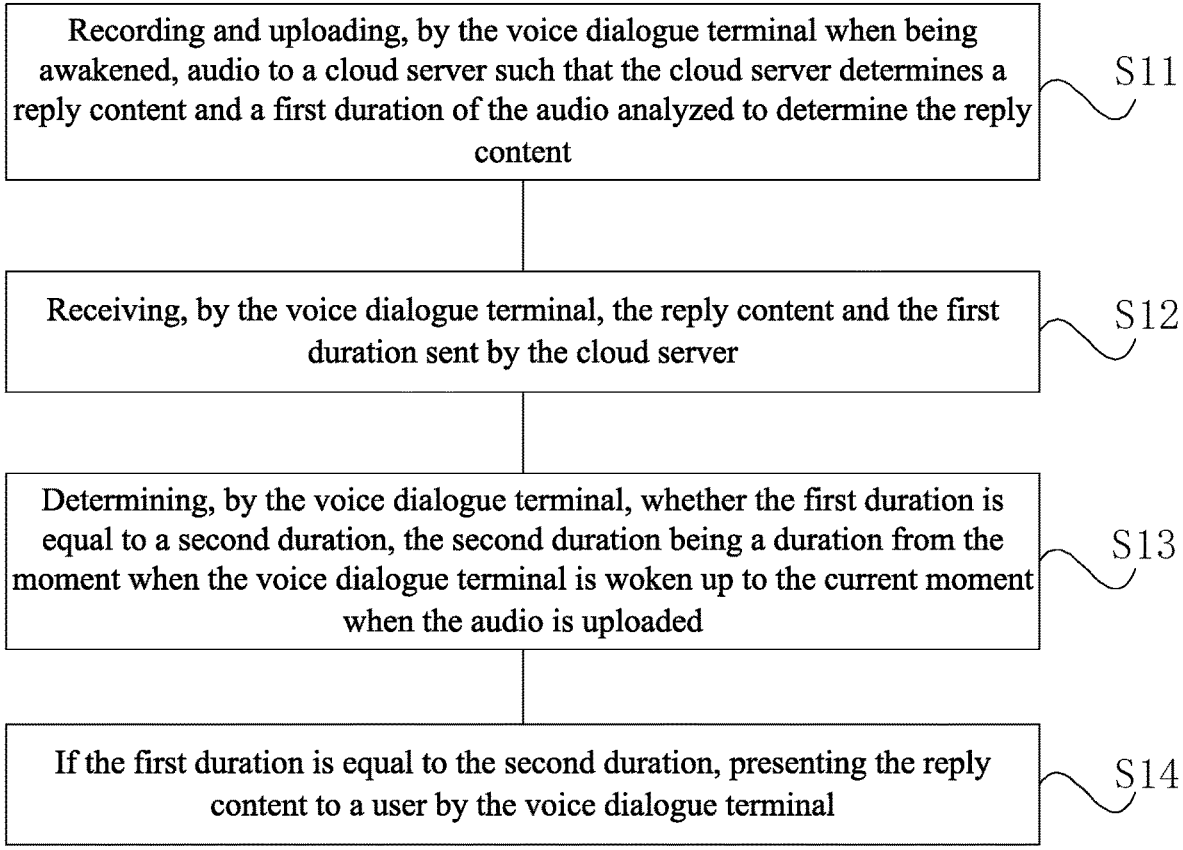
FIG. 1 is a flowchart of a full-duplex voice dialogue method according to an embodiment of the present disclosure.

In order to make the objectives, technical solutions, and advantages of the embodiments of the present disclosure clearer, the technical solutions in the embodiments of the present disclosure will be described clearly and completely in conjunction with the drawings in the embodiments of the present disclosure. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other without conflict.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

The present disclosure provides a full-duplex voice dialogue system, including a voice dialogue terminal and a cloud server, and also provides a full-duplex voice dialogue method and a software system running on the voice dialogue terminal and the cloud server, respectively. In an exemplary embodiment, the voice dialogue terminal may be a smartphone, a vehicle-mounted terminal, a smart speaker, a story machine, a household appliance product integrated with a dialogue function (e.g., an air conditioner, a refrigerator, a range hood, etc.), which is not limited in the present disclosure.

As shown in FIG. 1, an embodiment of the present disclosure provides a full-duplex voice dialogue method applied to a voice dialogue terminal, which includes the following steps.

S11. After being awakened, the voice dialogue terminal records and uploads audio to a cloud server such that the cloud server determines a reply content and a first duration of the audio analyzed for determining the reply content.

In an exemplary embodiment, the voice dialogue terminal in the present disclosure may integrate an SDK for realizing the full-duplex voice dialogue method. When the voice dialogue terminal is activated, the SDK may be initialized and the full-duplex mode may be automatically activated. When a sound signal is detected, a recording function may be activated, and the recorded audio may uploaded to the cloud server for analysis and processing in real time.

S12. The voice dialogue terminal receives the reply content and the first duration sent by the cloud server.

In an exemplary embodiment, the cloud server may conduct a real-time analysis on the received audio. When the complete semantics are determined based on the content as acquired, the reply content corresponding to the complete semantics may be determined, and the duration (first duration) of the recorded audio analyzed for this purpose may recorded.

S13. The voice dialogue terminal determines whether the first duration is equal to a second duration, the second duration being a duration from the moment when the voice dialogue terminal is awakened to the current moment when the audio is uploaded.

In an exemplary embodiment, the second duration may be a period from a recording start point to a first voice end endpoint (i.e., the duration of the audio uploaded by the voice dialogue terminal until the first voice end endpoint as detected).

S14. When the first duration is equal to the second duration, the voice dialogue terminal presents the reply content to a user. In an exemplary embodiment, the reply content may be a combination of one or more of audio, video, text, and pictures.

The voice dialogue terminal in the embodiment of the present disclosure may not only acquire the reply content determined by the cloud server, but may also acquire the duration (i.e., the first duration) of the audio analyzed by the cloud server to determine the reply content, and present the reply content to the user only when it is determined that the first duration is equal to the second duration (the duration from the moment when the voice dialogue terminal is awakened to the current moment when the audio is uploaded). In this way, the content based on which the cloud server determines the reply content will be consistent with the content uploaded by the voice dialogue terminal, and thus a correct reply can be provided.

In an exemplary embodiment, the voice dialogue terminal may be a smart speaker. A user said to the smart speaker: I want to listen to XXX's song. If the network signal is unstable, when the smart speaker sends the audio to the cloud server, the audio clip corresponding to "I want to listen to" arrives at the cloud server first and "XXX's song" arrives later. Within this delay period, the cloud server understands that the user wants to listen to a random song based on the audio clip "I want to listen to", and then recommends a random song to the user. Obviously, such a push result cannot meet the user's real listening needs. Based on the embodiment of the present disclosure, it is obvious that the duration of the audio clip "I want to listen to" is not equal to the duration of "I want to listen to XXX's song". Therefore, the above result will be discarded to wait for a new result, so as to ensure that a proper content will be presented to the user.

In an exemplary embodiment, the voice dialogue terminal may be a smartphone equipped with a voice assistant. A user will travel from Beijing to Shanghai on a business trip and arrive on the same day, and wants to check the weather in Shanghai today. The user may speak to the voice assistant of the smartphone: How is the weather today? Shanghai's. Obviously, what the user wants to express is "How is the weather today in Shanghai?" but he/she puts the location in the rear for supplementary explanation.

Since the cloud server analyzes the received audio content in real time and understands the semantics and "How is the weather today" expresses an integral semantics (it can be determined that the user is in Beijing based on the location of the smartphone), the cloud server will first determine the weather conditions in Beijing as the reply content, and send the reply content and the duration corresponding to "How is the weather today" to the smartphone.

However, since in the embodiment of the present disclosure, upon receiving the information, the smartphone will compare the duration corresponding to "How is the weather today" with the stored duration of "How is the weather today? In Shanghai" and find that there is a mismatch between the two duration, the current reply content will be discarded to wait for a new reply content, which further ensures the accuracy of the answer presented to the user.

In some embodiments, the end of the second duration may be the time point until the voice dialogue terminal receives the information (the reply content and the first duration) sent from the cloud server (i.e., the total audio duration of the recorded audio already uploaded when the information is received from the cloud server).

When the first duration is less than the second duration, whether a voice endpoint is contained in a redundant recording clip of the recorded audio corresponding to the second duration compared to the recorded audio corresponding to the first duration may be determined.

If it is determined not contained, the reply content may be presented to the user.

If it is determined contained, the reply content may be discarded to wait for the cloud server to send a new reply content and a new first duration.

In this embodiment, whether the user has input a new voice to the voice dialogue terminal after the reply content is determined and before the reply content is presented can be determined, that is, whether the user has a new question (there may be two reasons for asking a new question, one is to simply enter another statement, and the other is to give up the previous question), which ensures that the reply content presented is corresponding to the user's current topic.

In an exemplary embodiment, the voice dialogue terminal may be a smartphone equipped with a voice assistant. A user is in Beijing and wants to check the weather today in Beijing. The user speaks to the voice assistant of the smartphone: How is the weather today? . . . . How is the weather today in Beijing? Obviously, the user merely provided a sentence with different statements and the same meaning after speaking the first sentence.

Since the cloud server analyzes the received audio content in real time and understands the semantics and "How is the weather today" exactly expresses the complete semantics (it can be determined that the user is in Beijing based on the location of the smartphone), the cloud server will first determine the weather conditions in Beijing as the reply content, and send the reply content and the duration corresponding to "How is the weather today" to the smartphone.

However, since in the embodiment of the present disclosure, upon receiving the information, the smartphone will determine that the duration corresponding to "How is the weather today" is shorter than the second duration, the current reply content will be discarded and a new reply content will be awaited (which is the same as the reply content determined the first time), which can avoid presenting the same reply content as determined to the user twice, causing confusion to the user and deteriorating the user experience.

In an exemplary embodiment, the voice dialogue terminal may be a vehicle-mounted terminal with a voice interaction function. The network environment that a user encounters when driving outdoors may be unstable, and the user may be unable to get a timely reply when performing voice interaction with the vehicle-mounted terminal, and generally abandon one or more previous questions after waiting for a certain period of time (e.g., 5 s) and ask a new question. In the prior art, replies to all questions raised by the user are presented to the user at once after the signal is stable, and the user needs to browse one by one to find out the reply content corresponding to the latest question raised by the user, which seriously deteriorates the user experience.

However, in the embodiment of the present disclosure, whether the user has input a new voice to the voice dialogue terminal may be determined after the reply content is determined and before the reply content is presented, that is, whether the user has a new question, such that the current content that the user really wants to know can be responded accurately, optimizing the voice interaction process and improving the user experience.

In some embodiments, after the audio is recorded, the method may further include: performing voice endpoint detection on the recorded audio, and storing voice endpoint information as detected, the voice endpoint information including a voice start time point and a voice end time point; and said determining whether the voice endpoint is contained in the redundant recording clip of the recorded audio corresponding to the second duration compared to the recorded audio corresponding to the first duration may include:

querying the voice endpoint information to determine whether there is a voice start time point or a voice end time point belonging to the redundant recording clip.

In some embodiments, the present disclosure also provides a voice dialogue terminal, which may include: at least one processor, and a memory communicatively connected with the at least one processor, wherein the memory stores instructions executable by the at least one processor, and the instructions, when being executed by the at least one processor, cause the at least one processor to perform the steps of:

recording and uploading, by the voice dialogue terminal when being awakened, audio to a cloud server such that the cloud server determines a reply content and a first duration of the audio analyzed for determining the reply content;

receiving, by the voice dialogue terminal, the reply content and the first duration sent by the cloud server;

determining, by the voice dialogue terminal, whether the first duration is equal to a second duration, the second duration being a duration from the moment when the voice dialogue terminal is awakened to the current moment when the audio is uploaded; and when the first duration is equal to the second duration, presenting, by the voice dialogue terminal, the reply content to a user.

In some embodiments, the at least one processor of the voice dialogue terminal according to the present disclosure may be further configured to:

when the first duration is less than the second duration, determine whether a voice endpoint is contained in a redundant recording clip of the recorded audio corresponding to the second duration compared to the recorded audio corresponding to the first duration; and if it is determined not contained, present the reply content to the user; and if it is determined contained, discard the reply content, and wait for the cloud server to send a new reply content and a new first duration.

In some embodiments, the at least one processor of the voice dialogue terminal according to the present disclosure may be further configured to:

after the audio is recorded, perform voice endpoint detection on the recorded audio, and store voice endpoint information as detected, the voice endpoint information including a voice start time point and a voice end time point; and determine whether the voice endpoint is contained in the redundant recording clip of the recorded audio corresponding to the second duration compared to the recorded audio corresponding to the first duration may include:

query the voice endpoint information to determine whether there is a voice start time point or a voice end time point belonging to the redundant recording clip.

Figure 2:
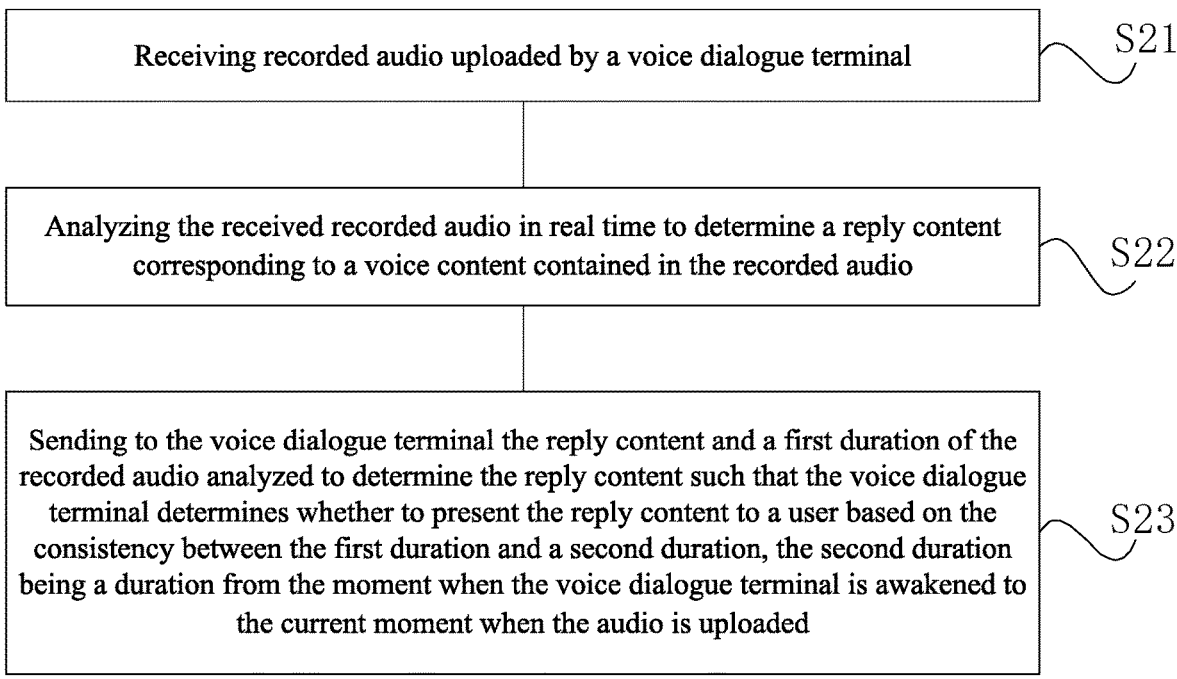
FIG. 2 is a flowchart of a full-duplex voice dialogue method according to another embodiment of the present disclosure.

As shown in FIG. 2, the present disclosure also provides a full-duplex voice dialogue method applied to a cloud server. The method may include the following steps.

In S21, recorded audio uploaded by a voice dialogue terminal is received.

In S22, the received recorded audio is analyzed in real time to determine a reply content corresponding to a voice content contained in the recorded audio.

In S23, the reply content and a first duration of the recorded audio analyzed for determining the reply content are sent to the voice dialogue terminal such that the voice dialogue terminal determines whether to present the reply content to a user based on a consistency between the first duration and a second duration, the second duration being a duration from the moment when the voice dialogue terminal is awakened to the current moment when the audio is uploaded.

In some embodiments, if the first duration is less than the second duration and a voice endpoint is contained in a redundant recording clip of the recorded audio corresponding to the second duration compared to the recorded audio corresponding to the first duration, the redundant recording clip is analyzed continuously to determine a new reply content and a new first duration; and the new reply content and the new first duration are sent to the voice dialogue terminal.

In some embodiments, the present disclosure also provides a cloud server, which may include: at least one processor, and a memory communicatively connected with the at least one processor, wherein the memory stores instructions executable by the at least one processor, and the instructions, when being executed by the at least one processor, cause the at least one processor to perform the steps of:

receiving recorded audio uploaded by a voice dialogue terminal;

analyzing the received recorded audio in real time to determine a reply content corresponding to a voice content contained in the recorded audio; and sending to the voice dialogue terminal the reply content and a first duration of the recorded audio analyzed for determining the reply content such that the voice dialogue terminal determines whether to present the reply content to a user based on a consistency between the first duration and a second duration, the second duration being a duration from the moment when the voice dialogue terminal is awakened to the current moment when the audio is uploaded.

In some embodiments, the at least one processor of the cloud server according to the present disclosure may be further configured to:

when the first duration is less than the second duration and a voice endpoint is contained in a redundant recording clip of the recorded audio corresponding to the second duration compared to the recorded audio corresponding to the first duration, continue to analyze the redundant recording clip and determine a new reply content and a new first duration; and send the new reply content and the new first duration to the voice dialogue terminal.

Figure 3:
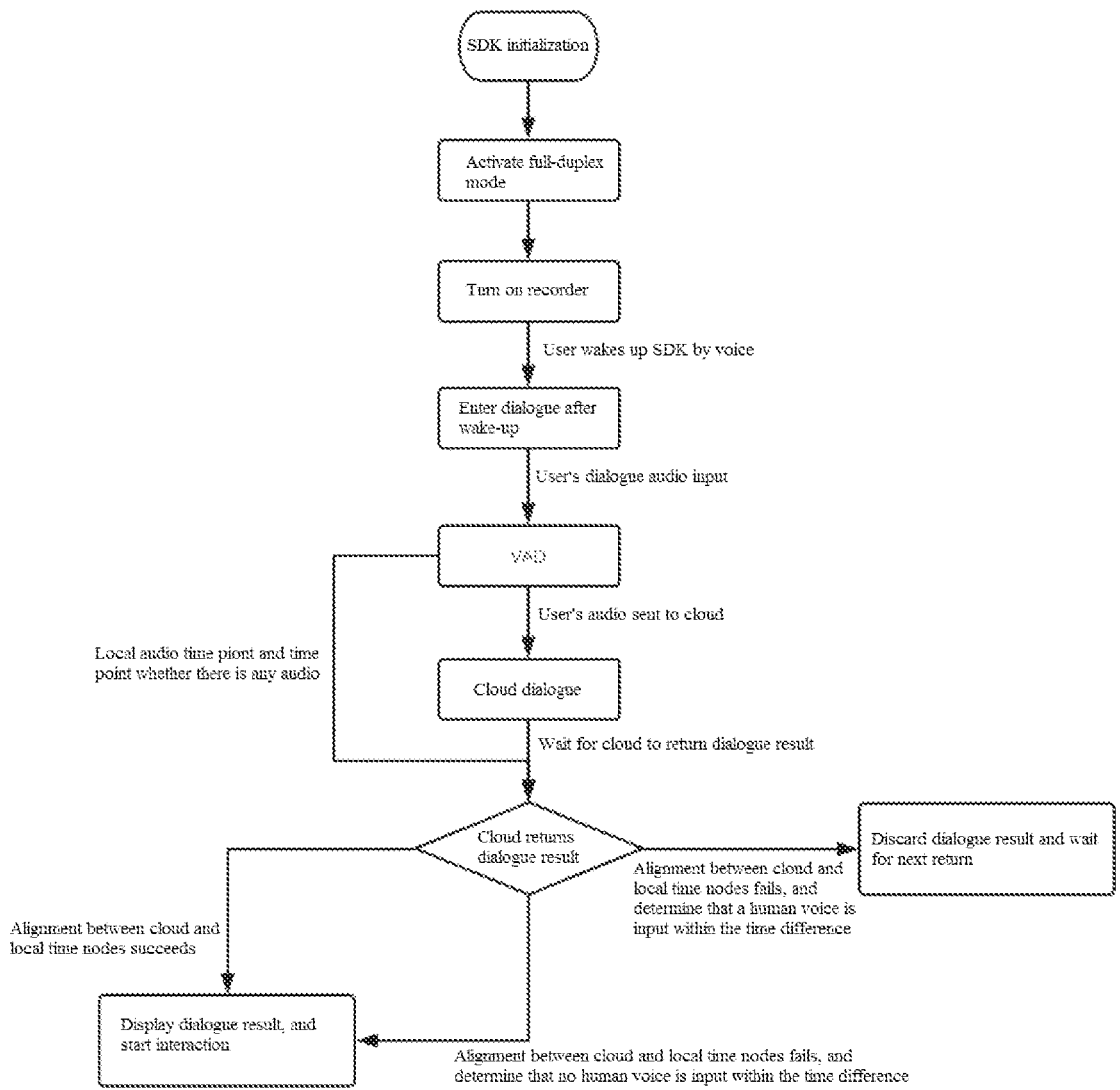
FIG. 3 is a flowchart of a full-duplex voice dialogue method according to still another embodiment of the present disclosure.

FIG. 3 is a flowchart of another embodiment of the full-duplex voice dialogue method according to the present disclosure. The method includes the following steps.

In step 1, first, an SDK is initialized, and a WAKEUP node, a VAD node, a dialogue recognition node, etc. are initialized.

In step 2, after the initialization is completed, a full-duplex mode is activated. In this mode, a recording function is always on to ensure that a user can perform voice interaction at any time.

In step 3, a recorder node is activated to continuously monitor the user's voice changes, and continuously input the user's voice to the SDK.

In step 4, the user enters a wake-up word with speech to successfully wake up a voice interaction platform and activate an interaction mode.

In step 5, the audio of speech in step 4 is input into the VAD node. In this case, the VAD node records the total time length of the audio as input, and continuously determines whether there is any human voice and saves a time point when the human voice starts and a time point when the human voice stops.

In step 6, the audio input cached in step 4 is sent to the cloud.

In step 7, after the cloud returns a dialogue result, whether the total audio duration recorded locally is equal to the total audio duration returned by the cloud is determined. If they are consistent, it means that the dialogue is aligned, and the dialogue result is displayed to the user normally.

In step 8, if the total audio duration recorded locally is longer than the total audio duration returned from the cloud, whether a human voice is detected within a time difference between the two durations is determined. If no human voice is detected, it means that the user is waiting for the result of this dialogue, and the result of the dialogue is displayed to the user normally.

In step 9, if the total audio duration recorded locally is longer than the total audio duration returned from the cloud, whether a human voice is detected within a time difference between the two audio durations is determined. If a human voice is detected, it means that the user has made a voice input again after this interaction, and maybe the user has already started a new topic at this moment, and the result of this dialogue is discarded.

In the embodiment of the present disclosure, firstly, the duration of the interaction may be continuously saved locally and in the cloud during the interaction process, and the end time point of the current dialogue may be also carried each time the cloud returns the dialogue result. In this case, the time saved locally may be compared with the time point returned by the cloud. If the difference between the time point saved locally and the time point returned by the cloud exceeds 5 seconds, the result of this dialogue may be discarded to ensure synchronization between the local and the cloud.

Secondly, the VAD technology is adopted to continuously detect the user's voice input based on the first step. If the user has a voice input within the time point difference between the local and the cloud, it means that the user has a voice input after the cloud returns the result. In this way, the result of this dialogue can be discarded more accurately. If the user has no voice input within the time point difference between the local and the cloud, it means that the user has been waiting for the result of the last interaction, and the result of this dialogue should not be discarded. This strategy can ensure interaction with the user on the same topic.

It should be noted that the foregoing method embodiments are described as a series of actions for the sake of simple description, but those skilled in the art would know that the present invention is not limited by the sequence of actions described. Because according to the present invention, certain steps can be performed in other orders or simultaneously. Secondly, those skilled in the art would also know that the embodiments described in the specification are all preferred embodiments, and the involved actions are not necessarily required by the present invention. In the above embodiments, the description of each embodiment has its own emphasis. For a part that is not detailed in an embodiment, reference can be made to the related descriptions of other embodiments.

Figure 4:
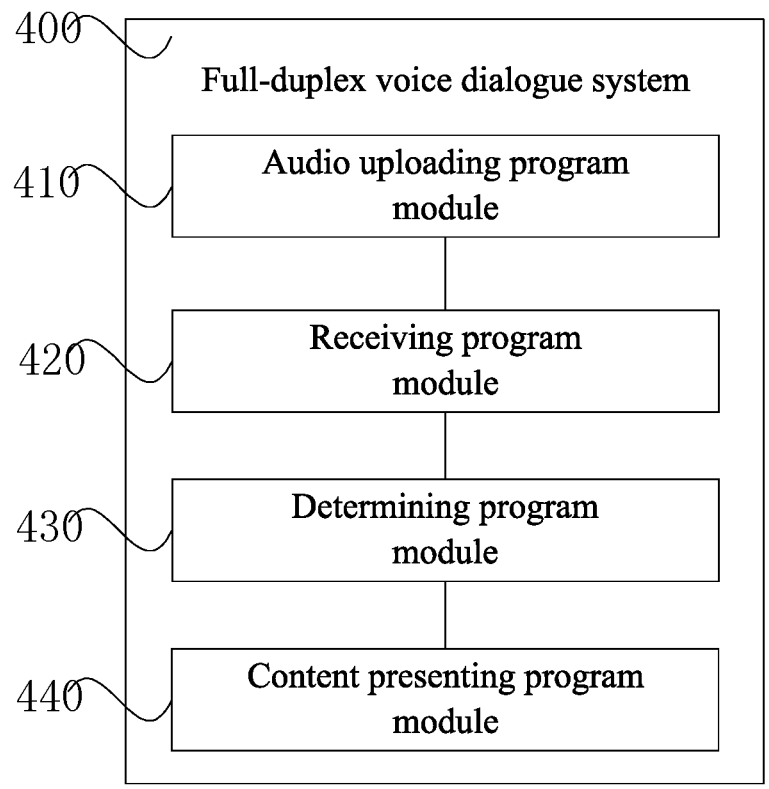
FIG. 4 is a functional block diagram of a full-duplex voice dialogue system according to an embodiment of the present disclosure.

As shown in FIG. 4, an embodiment of the present disclosure also provides a full-duplex voice dialogue system 400 applied to a voice dialogue terminal. The system may include:

an audio uploading program module 410 configured to, record and upload, by the voice dialogue terminal when being awakened, audio to a cloud server such that the cloud server determines a reply content and a first duration of the audio analyzed for determining the reply content;

a receiving program module 420 configured to receive, by the voice dialogue terminal, the reply content and the first duration sent by the cloud server;

a determining program module 430 configured to determine, by the voice dialogue terminal, whether the first duration is equal to a second duration, the second duration being a duration from the moment when the voice dialogue terminal is awakened to the current moment when the audio is uploaded; and a content presenting program module 440 configured to, when the first duration is equal to the second duration, presenting, by the voice dialogue terminal, the reply content to a user.

In some embodiments, the system may further include a voice endpoint querying program module configured to, when the first duration is less than the second duration, determine whether a voice endpoint is contained in a redundant recording clip of the recorded audio corresponding to the second duration compared to the recorded audio corresponding to the first duration; and if it is determined not contained, present the reply content to the user; and if it is determined contained, discard the reply content, and wait for the cloud server to send a new reply content and a new first duration.

In some embodiments, the system may further include an endpoint detecting program module configured to, after the audio is recorded, perform voice endpoint detection on the recorded audio, and store voice endpoint information as detected, the voice endpoint information including a voice start time point and a voice end time point; and said determining whether the voice endpoint is contained in the redundant recording clip of the recorded audio corresponding to the second duration compared to the recorded audio corresponding to the first duration may include:

querying the voice endpoint information to determine whether there is a voice start time point or a voice end time point belonging to the redundant recording clip.

Figure 5:
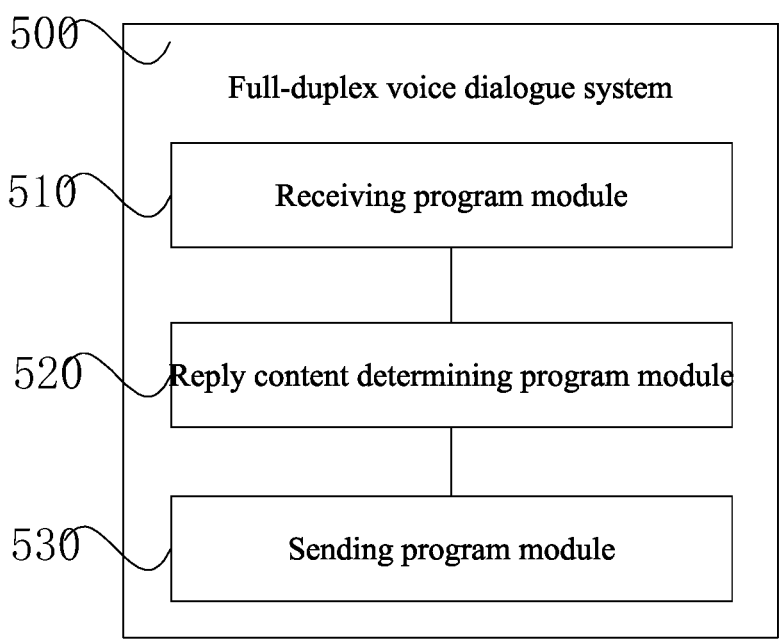
FIG. 5 is a functional block diagram of a full-duplex voice dialogue system according to another embodiment of the present disclosure.

As shown in FIG. 5, an embodiment of the present disclosure also provides a full-duplex voice dialogue system 500 applied to a cloud server. The system may include:

a receiving program module 510 configured to receive recorded audio uploaded by a voice dialogue terminal;

a reply content determining program module 520 configured to analyze the received recorded audio in real time to determine a reply content corresponding to a voice content contained in the recorded audio; and a sending program module 530 configured to send to the voice dialogue terminal the reply content and a first duration of the recorded audio analyzed for determining the reply content such that the voice dialogue terminal determines whether to present the reply content to a user based on a consistency between the first duration and a second duration, the second duration being a duration from the moment when the voice dialogue terminal is awakened to the current moment when the audio is uploaded.

In some embodiments, the reply content determining program module may be further configured to, when the first duration is less than the second duration and a voice endpoint is contained in a redundant recording clip of the recorded audio corresponding to the second duration compared to the recorded audio corresponding to the first duration, continue to analyze the redundant recording clip and determine a new reply content and a new first duration; and the sending program module may be further configured to send the new reply content and the new first duration to the voice dialogue terminal.

An embodiment of the present disclosure also provides a non-volatile computer-readable storage medium, which stores one or more programs including executable instructions. The executable instruction can be read and executed by an electronic device (including but not limited to a computer, a server, or a network device, etc.) to carry out the full-duplex voice dialogue method as described in any of the above in the present disclosure.

An embodiment of the present disclosure also provides a computer program product, which may include a computer program stored on a non-volatile computer-readable storage medium. The computer program may include program instructions. The program instructions, when being executed by a computer, cause the computer to carry out the duplex voice dialogue method as described in any of the above.

An embodiment of the present disclosure also provides an electronic device, which may include at least one processor and a memory communicatively connected with the at least one processor. The memory stores instructions executable by the at least one processor. The instructions, when being executed by the at least one processor, causes the at least one processor to carry out the full-duplex voice dialogue method.

An embodiment of the present disclosure also provides a storage medium on which a computer program may be stored. The program, when being executed by a processor, causes the processor to carry out the full-duplex voice dialogue method.

The above full-duplex voice dialogue system according to the embodiment of the present disclosure can be adopted to carry out the full-duplex voice dialogue method according to the embodiment of the present disclosure, and accordingly achieve the technical effect of the above full-duplex voice dialogue method according to the embodiment of the present disclosure, which will not be repeated here. In the embodiments of the present disclosure, a hardware processor may be adopted to implement related functional modules.

Figure 6:
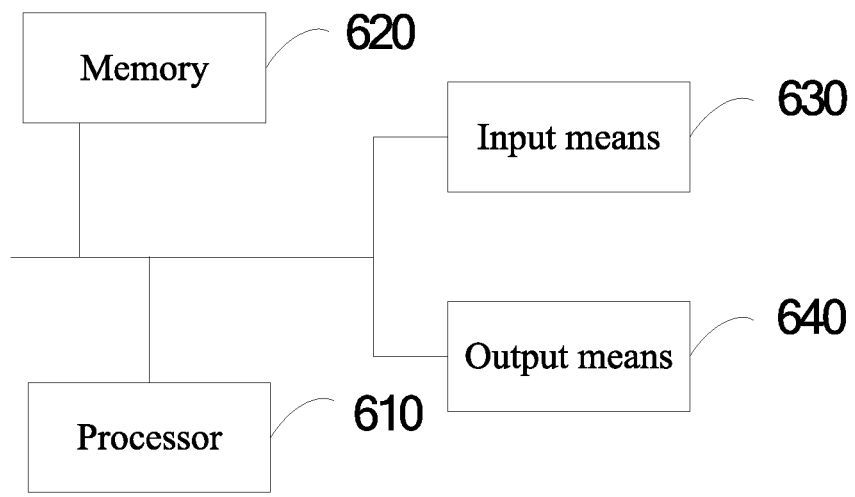
FIG. 6 is a schematic structural diagram of an electronic device according to an embodiment of the present disclosure.

FIG. 6 is a schematic diagram of a hardware structure of an electronic device for performing a methods of full-duplex voice dialogue according to another embodiment of the present application. As shown in FIG. 6, the device includes one or more processors 610 and a memory 620, taking one processor 610 as an example.

The device for performing methods of full-duplex voice dialogue may further include an input means 630 and an output means 640.

The processor 610, the memory 620, the input means 630, and the output means 640 may be connected through a bus or in other ways. In FIG. 6, connection through a bus is used as an example.

The memory 620 is a non-volatile computer-readable storage medium, and can be used to store non-volatile software programs, non-volatile computer executable programs, and modules, such as program instructions/modules corresponding to the methods of full-duplex voice dialogue in the embodiments of the present application. The processor 610 performs various functional applications and data processing of a server by running the non-volatile software programs, instructions, and modules stored in the memory 620, that is, implementing the methods of full-duplex voice dialogue in the foregoing method embodiment.

The memory 620 may include a storage program area and a storage data area. The storage program area may store an operating system and application programs required by at least one function. The storage data area may store data generated according to the use of a full-duplex voice dialogue systems and the like. In addition, the memory 620 may include a high-speed random access memory, and may also include a non-volatile memory, such as at least one magnetic disk storage device, a flash memory device, or other non-volatile solid-state storage devices. In some embodiments, the memory 620 may optionally include memories remotely disposed with respect to the processor 610, and these remote memories may be connected to a full-duplex voice dialogue through a network. Examples of the above network include but are not limited to the Internet, intranet, local area network, mobile communication network, and combinations thereof.

The input means 630 can receive input digital or character information, and generate signals related to user settings and function control of a full-duplex voice dialogue.

The output means 640 may include a display device such as a display screen.

The one or more modules are stored in the memory 620, and when executed by the one or more processors 610, perform the methods of full-duplex voice dialogue in any of the above method embodiments.

The above-mentioned products can perform the method according to the embodiments of the present application, and have corresponding function modules and beneficial effects for performing the method. For technical details that are not described in detail in this embodiment, reference may be made to the method provided in the embodiments of the present application.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices;

(4) Server providing computing services and including a processor, hard disk, memory, system bus, etc., with a similar architecture to a general-purpose computer but a higher processing power and stability, reliability, security, scalability, manageability and for providing highly reliable services; and (5) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A full-duplex voice dialogue method applied to a voice dialogue terminal, comprising:
   recording and uploading, by the voice dialogue terminal when being awakened, audio to a cloud server such that the cloud server determines a reply content and a first duration of the audio being analyzed for determining the reply content;

receiving, by the voice dialogue terminal, the reply content and the first duration sent by the cloud server;

determining, by the voice dialogue terminal, whether the first duration is equal to a second duration, the second duration being a duration from a moment when the voice dialogue terminal is awakened to a current moment when the audio is uploaded; and when the first duration is equal to the second duration, presenting the reply content to a user by the voice dialogue terminal.

2. The method according to claim 1, further comprising:
when the first duration is less than the second duration, determining whether a voice endpoint is contained in a redundant recording clip of the recorded audio corresponding to the second duration compared to the recorded audio corresponding to the first duration; and if it is determined not contained, presenting the reply content to the user; and if it is determined contained, discarding the reply content, and waiting for the cloud server to send a new reply content and a new first duration.

3. The method according to claim 2, wherein after the audio is recorded, the method further comprises performing voice endpoint detection on the recorded audio, and storing voice endpoint information as detected, the voice endpoint information comprising a voice start time point and a voice end time point; and said determining whether the voice endpoint is contained in the redundant recording clip of the recorded audio corresponding to the second duration compared to the recorded audio corresponding to the first duration comprises:

querying the voice endpoint information to determine whether there is a voice start time point or a voice end time point belonging to the redundant recording clip.

4. A full-duplex voice dialogue method applied to a cloud server, comprising:
receiving recorded audio uploaded by a voice dialogue terminal;

analyzing the received recorded audio in real time to determine a reply content corresponding to a voice content contained in the received recorded audio; and sending to the voice dialogue terminal the reply content and a first duration of the recorded audio being analyzed for determining the reply content such that the voice dialogue terminal determines whether to present the reply content to a user based on a consistency between the first duration and a second duration, the second duration being a duration from a moment when the voice dialogue terminal is awakened to a current moment when the audio is uploaded.

5. The method according to claim 4, further comprising:
when the first duration is less than the second duration and a voice endpoint is contained in a redundant recording clip of the received recorded audio corresponding to the second duration compared to the received recorded audio corresponding to the first duration, continuing to analyze the redundant recording clip and determine a new reply content and a new first duration; and sending the new reply content and the new first duration to the voice dialogue terminal.

6. A voice dialogue terminal, comprising at least one processor and a memory communicatively connected with the at least one processor, wherein the memory stores instructions executable by the at least one processor, and the instructions, when being executed by the at least one processor, cause the at least one processor to perform the steps of:

recording and uploading, by the voice dialogue terminal when being awakened, audio to a cloud server such that the cloud server determines a reply content and a first duration of the audio being analyzed for determining the reply content;

receiving, by the voice dialogue terminal, the reply content and the first duration sent by the cloud server;

determining, by the voice dialogue terminal, whether the first duration is equal to a second duration, the second duration being a duration from a moment when the voice dialogue terminal is awakened to a current moment when the audio is uploaded; and if the first duration is equal to the second duration, presenting the reply content to a user by the voice dialogue terminal.

7. The voice dialogue terminal according to claim 6, wherein the at least one processor is further configured to:
when the first duration is less than the second duration, determine whether a voice endpoint is contained in a redundant recording clip of the recorded audio corresponding to the second duration compared to the recorded audio corresponding to the first duration; and if it is determined not contained, present the reply content to the user; and if it is determined contained, discard the reply content, and wait for the cloud server to send a new reply content and a new first duration.

8. The voice dialogue terminal according to claim 7, wherein the at least one processor is further configured to:
after the audio is recorded, perform voice endpoint detection on the recorded audio, and store voice endpoint information as detected, the voice endpoint information comprising a voice start time point and a voice end time point; and said determining whether the voice endpoint is contained in the redundant recording clip of the recorded audio corresponding to the second duration compared to the recorded audio corresponding to the first duration comprises:

querying the voice endpoint information to determine whether there is a voice start time point or a voice end time point belonging to the redundant recording clip.

9. A cloud server, comprising at least one processor and a memory communicatively connected with the at least one processor, wherein the memory stores instructions executable by the at least one processor, and the instructions, when being executed by the at least one processor, cause the at least one processor to perform the steps of the method of claim 4.

10. The cloud server according to claim 9, wherein the at least one processor is further configured to:
when the first duration is less than the second duration and a voice endpoint is contained in a redundant recording clip of the recorded audio corresponding to the second duration compared to the recorded audio corresponding to the first duration, continue to analyze the redundant recording clip and determine a new reply content and a new first duration; and send the new reply content and the new first duration to the voice dialogue terminal.

* * * * *